Nov. 23, 1937.  C. G. QUICK ET AL  2,100,016
DELIVERY MECHANISM FOR USE IN DELIVERING THE PRODUCTS
OF PRINTING MACHINES IN COUNTED BATCHES
Filed May 8, 1936   2 Sheets-Sheet 2
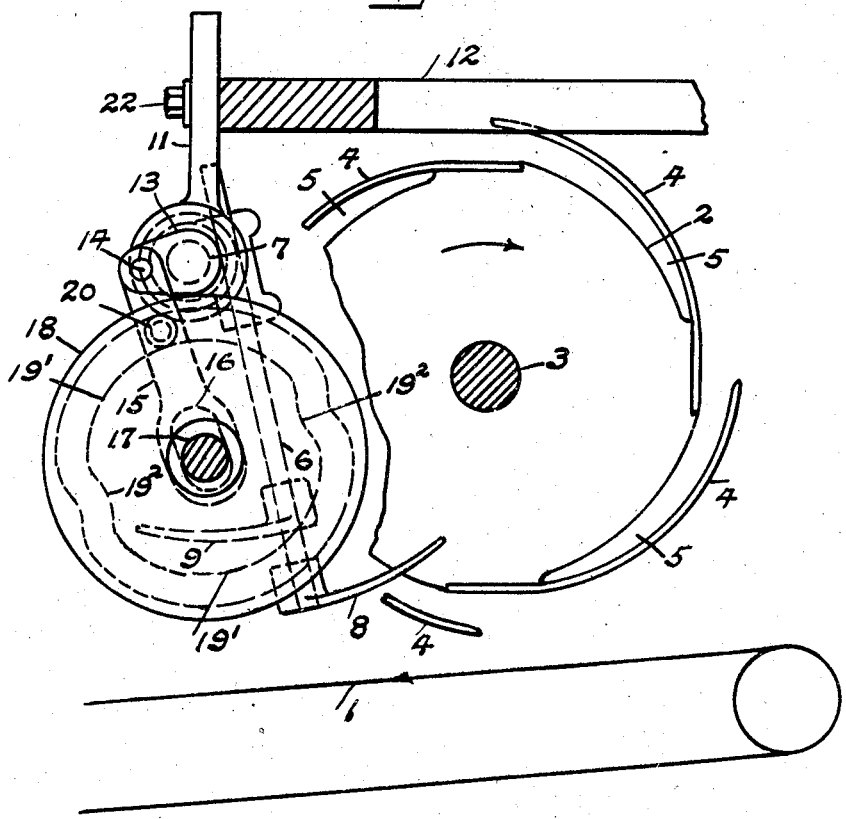
INVENTORS.
Cecil G. Quick
Donald A. Ball
William A. Whitehead
by Albert J. Horton
ATTY Patented Nov. 23, 1937

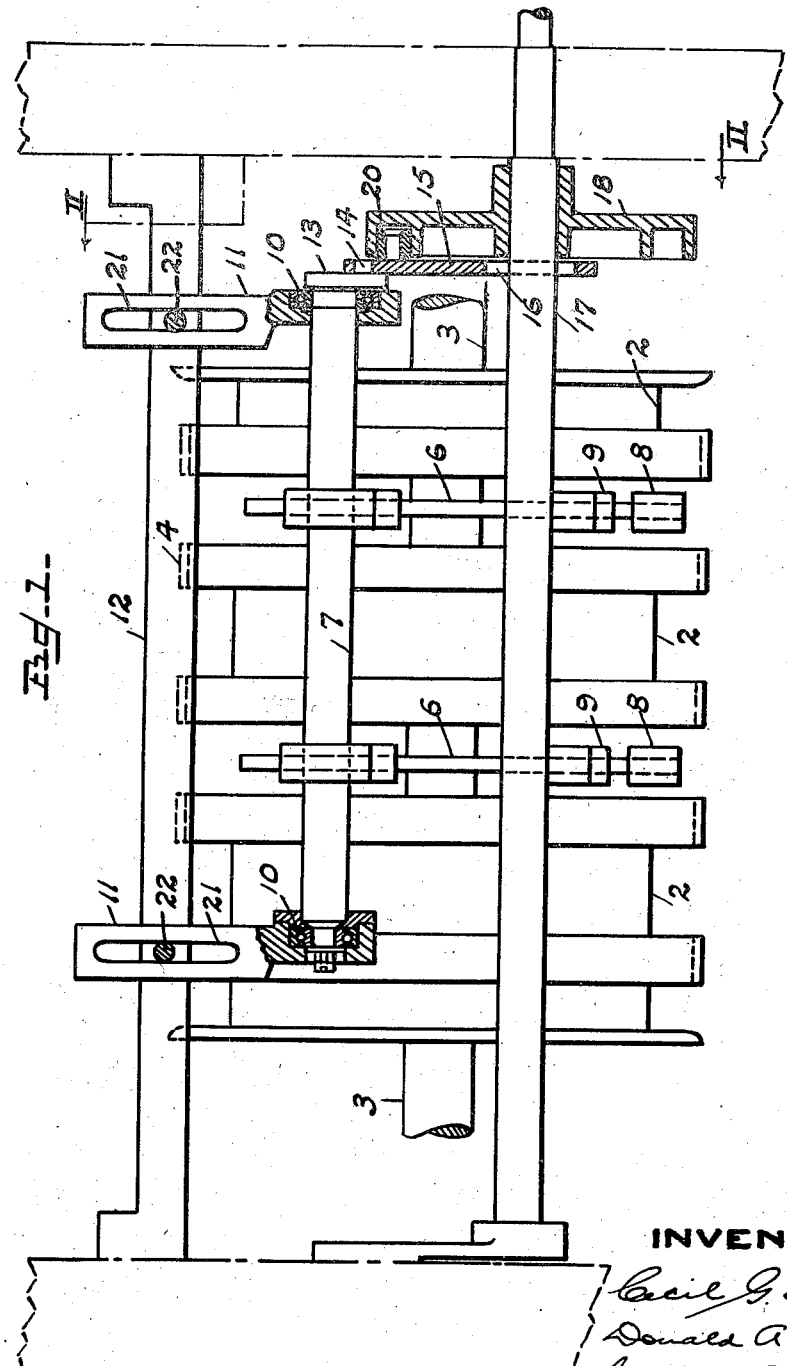

2,100,016

UNITED STATES PATENT OFFICE 2,100,016

DELIVERY MECHANISM FOR USE IN DELIVERING THE PRODUCTS OF PRINTING MACHINES IN COUNTED BATCHES

Cecil George Quick, Donald Arthur Ball, and William Arnold Whitehead, London, England, assignors to R. Hoe & Co., Inc., New York, N. Y., a corporation of New York Application May 8, 1936, Serial No. 78,648
In Great Britain June 4, 1935

12 Claims. (Cl. 93—93)

This invention relates to delivery mechanism for use in delivering the products of printing machines in counted batches.

In the specification of an application Serial No. 739,750 filed August 14, 1934, there is described an invention according to which a delivery mechanism comprises a rotatable fly, a conveyor device which, while receiving products from the fly, moves in the same general direction as the delivery side of the fly, and spaced abutment means up to which products are carried by the fly so as to be caused to fall from the fly on to the conveyor device, and means for so operating the abutment means that the count products are caused thereby to fall from the fly at a later time in the rotation of the fly than products between succeeding count products.

In the arrangement described in the said specification the abutment means were constituted by discs recessed to provide one or more pockets, the unrecessed portion of the periphery of the discs providing a first abutment surface and the wall of the pockets providing a second abutment surface, and the discs were rotated to present the first and then the second surface of the discs so that products passing from the fly were caused by the first surface to pass from the fly at an earlier point in the rotation of the fly than when the second surface was presented to a product and thus this product was displaced with respect to preceding and succeeding products on the conveyor device. The discs were rotated slowly to present the unrecessed periphery to a number of products and then were moved quickly through a position in which the pocket was presented to a single product, this being effected by worm and worm wheel gearing, the worm of which is not only rotated but is also moved axially.

The present invention has for its object to provide a modified arrangement dispensing with the use of discs.

According to the present invention each of the spaced abutment means comprises a member which is mounted for oscillatory movement towards and away from the fly and which carries two abutment surfaces which are positioned at different distances from the axis of oscillation, and a cam or equivalent device is provided for effecting oscillatory movement of the member, the two surfaces being so disposed that in one position of the member one of the surfaces is presented to products carried by the fly and when the member is in the other position the first surface is clear of the products and the other surface is presented thereto. This cam device is arranged to effect the oscillatory movement quickly so that one surface is presented to only a single product while the other surface is presented to the number of products constituting a counted batch and by reason of the relative positioning of the two surfaces, the extent to which the products travel with the fly is different, when one surface is presented, from the extent when the other surface is presented, and in this way the single copy is displaced on the conveyor device and affords an indication of the extent of a counted batch.

The invention is illustrated in the accompanying drawings, in which Figure 1 is a side elevation partly in section and Figure 2 is a sectional elevation on the line II—II, Figure 1.

1 indicates an endless conveyor of any usual form and disposed on its upper or operative run to receive products from a fly comprising hub members 2 secured to a driven shaft 3 and arms 4 secured to the hubs 2, the arms defining with the hubs a plurality of pockets denoted by the references 5. The shaft 3 is driven in a clockwise direction as seen in Figure 2, so that the delivery side of the fly (i. e. the lower side as seen in Figure 2) moves in the same general direction as the operative run of the conveyor 1. It will be understood that the pockets 5 have products fed to them in the usual manner with their folded edges leading and mechanism will now be described for causing the products to be displaced from the pockets as the fly rotates, the displaced products falling from the fly on to the conveyor 1.

The mechanism comprises two spaced arms 6 which are secured at their upper ends to a shaft 7 parallel with the shaft 3, the shaft being disposed above the axis of rotation of the fly and on the delivery side of the vertical plane passing through the axis of rotation of the fly (i. e. as seen in Figure 2 on the left hand side of the vertical plane). These arms are displaced between (considered longitudinally of the fly) adjacent sets of fly arms 4 and each arm 6 carries abutment members in the form of slightly curved fingers 8, 9. The two fingers 8 and 9 are carried on the arms 6 at different distances from the axis of the shaft 7, and, moreover, the fingers 8, 9 extend in opposite directions from the arms 6, i. e. while both sets of fingers 8, 9 extend more or less at right angles from the arms 6, the fingers 8 are directed towards the fly shaft 3 and the fingers 9 extend in a direction away from the fly shaft.

The shaft 7 is mounted to oscillate in bearings 10 carried by brackets 11 secured to a frame member 12. The shaft 7 also has secured to it at one end a crank 13 pivotally connected at 14 to one end of a link 15 which is slotted at 16 at its other end to embrace a shaft 17. The shaft 17 is driven from some convenient rotating part of the machine (preferably from the fly) and has fast with it a disc 18 having a cam groove in its face adjacent the link 15 adapted to receive a roller 20 carried by the link 15 between its two ends. The cam groove has two portions $19^1$ which are concentric with the axis of rotation of the disc and these two portions are connected at their adjacent ends by two nonconcentric portions $19^2$ that may be formed as shown in Figure 2.

In operation, so long as the roller 20 is (as is shown in the drawings) in one or other of the two concentric portions $19^1$ of the cam groove, the first finger 8 on the two arms 6 is held in the zone between two adjacent sets of fly arms and products carried around with the fly are brought into engagement at their folded leading edges with these fingers 8 and are caused thereby to fall from the fly and on to the conveyor device 1 below the fly, the second fingers 9 being clear of and outside the path. This operation will continue until in the rotation of the shaft 17 one of the portions $19^2$ of the cam groove engages the roller 20 at which time the link 15 will be caused quickly to reciprocate (i. e. to move first in one direction and then back again to its original position) the roller having now entered the second coaxial portion $19^1$ of the cam groove. By reason of the reciprocation of the link 15 an oscillatory motion is imparted to the crank 13 and hence to the first shaft 7. The parts are so arranged that the resulting movement of the two arms 6 carrying the fingers 8, 9 is sufficient first to move the first fingers 8 further into the zones between the sets of fly arms so as to be clear of the path followed by the products as they are carried round with the fly and simultaneously to move the second fingers 9 into the said path and then to restore both sets of fingers to their original position which they retain until the second cam portion is presented to the roller 20, this operation being effected at a speed sufficient to ensure that the second fingers are presented to only a single product and that the product preceding and the product succeeding this single product have the first fingers 8 presented to them.

It will be seen that as the fingers 9 are disposed on the arms 6 spaced upwardly from and with reference to the fingers 8, the product to which the fingers 9 are presented is allowed to travel somewhat further with the fly than are those products to which the fingers 8 are presented.

The arrangement is such that this product, by being allowed to travel slightly further with the fly than the preceding and succeeding products, will, when it falls on to the conveyor 1, overlie to some extent the preceding products and will also lie ahead of the succeeding products: whereby it will constitute a "count" product.

The fingers 8 are, as stated, now in their position of operation and will continue to operate until the next cam portion $19^2$ causes the fingers 8 to move out of and back to their operative positions and at the same time causes the fingers 9 to move into and out of operative position in the manner already described. This will cause a second "count" copy to be delivered and so on, the various "count" copies indicating between them the extent of a counted batch.

The number of products constituting a counted batch will of course depend on the number of rotations made by the fly in the intervals between the moving of the fingers 9 into operative position.

The necessary speed of operation of the disc 18 to carry the cam portions $19^2$ quickly through their operating positions can be effected either by rotating the disc at a constant speed and making the disc of large diameter so that the cam portions $19^2$ of the cam groove can be made of such shape as to effect the desired quick operation, or by employing a smaller disc and rotating the disc first at a slow speed and then quickly rotating the disc to carry the cam portions $19^2$ through their operating positions. This latter operation of the disc can conveniently be effected by the worm and worm wheel gearing described in the specification of the application Serial No. 739,750 the worm of the gearing having axial and rotational movements which at one time are subtractive (to produce the relatively slow motion) and at another time are additive (to produce the relatively quick motion).

The brackets 11 may, as shown, be adjustable in a vertical plane on the frame, movement of the brackets effecting an adjustment of the position of the arms 6 and hence of the fingers 8, 9 relative to the fly, the brackets being slotted at 21 to receive bolts 22 screwing into the frame 12 and serving to clamp the brackets in the positions to which they are adjusted.

What we claim is:—

1. Delivery mechanism comprising in combination a fly, means rotating the fly, a conveyor device adapted to move past the fly in such a direction that while receiving products from the fly the conveyor moves in the same general direction as the delivery side of the fly, a pair of abutment members, means to oscillate the abutment members into two positions spaced differently from the periphery of the fly in the first of which positions a first abutment member is presented to products carried by the fly and in the second of which positions a second abutment member is presented, the two members being so disposed relatively to each other that the said second abutment member when presented allows products to travel further with the fly than the first abutment member, and means operating periodically to quickly oscillate the members between the first and second positions.

2. Delivery mechanism comprising in combination a fly, means rotating the fly, a conveyor device adapted to move past the fly in such a direction that while receiving products from the fly the conveyor moves in the same general direction as the delivery side of the fly, a pair of spaced arms, means mounting the arms for oscillatory movement between two positions, a pair of abutment members carried by each arm, each arm and members thereon being so disposed that in a first position of the arm one of the members is presented to products carried by the fly and in a second position the other abutment member is presented, and the members on each arm being so disposed at different distances from the axis of oscillation of the arm that when one member is presented to the products they are allowed to travel further with the fly than when the other member is presented, and means operating periodically to oscillate the arms in unison between the two positions to carry the said one member of both arms into and out of operative position.

3. Delivery mechanism comprising in combination a fly, means rotating the fly, a conveyor device adapted to move past the fly in such a direction that while receiving products from the fly the conveyor moves in the same general direction as the delivery side of the fly, a pair of spaced arms, means supporting the arms for oscillatory movement between two positions, the axis of oscillation being above and to one side of the axis of rotation of the fly, a first abutment finger carried by each arm and held in a first position of the arm presented to products carried by the fly, a second finger carried by each arm and disposed thereon at a smaller distance from the axis of oscillation of the arm than the first finger, the second fingers being presented to the products when the arms are moved to a second position, and means operating periodically to oscillate the arms quickly in unison between the first and second positions.

4. Delivery mechanism comprising in combination a fly, means rotating the fly, a conveyor device adapted to move past the fly in such a direction that while receiving products from the fly the conveyor moves in the same general direction as the delivery side of the fly, a pair of spaced arms, means mounting the arms for oscillatory movement between two positions, a pair of abutment members carried by each arm, each arm and members thereon being so disposed that in a first position of the arm one of the members is presented to products carried by the fly and in a second position the other abutment member is presented, and the members on each arm being so disposed at different distances from the axis of oscillation of the arm that when one member is presented to the products they are allowed to travel further with the fly than when the other member is presented, and continuously operating cam mechanism operating periodically to oscillate the arms in unison between the two positions to carry the said one member of both arms into and out of operative position.

5. Delivery mechanism comprising in combination a fly, means rotating the fly, a conveyor device adapted to move past the fly in such a direction that while receiving products from the fly the conveyor moves in the same general direction as the delivery side of the fly, a pair of spaced arms, means supporting the arms for oscillatory movement between two positions, the axis of oscillation being above and to one side of the axis of rotation of the fly, a first abutment finger carried by each arm and held in a first position of the arm presented to products carried by the fly, a second finger carried by each arm and disposed thereon at a smaller distance from the axis of oscillation of the arm than the first finger, the second fingers being presented to the products when the arms are moved to a second position, and continuously operating cam mechanism operating periodically to oscillate the arms quickly in unison between the first and second positions.

6. Delivery mechanism comprising in combination a fly, means rotating the fly, a conveyor device adapted to move past the fly in such a direction that while receiving products from the fly the conveyor moves in the same general direction as the delivery side of the fly, a shaft, a pair of arms secured in spaced relation on the shaft, means mounting the shaft for oscillating movement between two positions, a pair of abutment members carried by each arm, each arm and members thereon being so disposed that in one position of the shaft one of the members of each arm is held presented to products carried by the fly and in the second position of the shaft the other members of each arm are held presented to the products, one of the members on each arm being disposed at a different distance from the shaft so that when the said one member is presented the products are allowed to travel further with the fly than when the other members are presented, and means operating periodically to oscillate the shaft between its two positions to carry the said one member into and out of operative position.

7. Delivery mechanism comprising in combination a fly, means rotating the fly, a conveyor device adapted to move past the fly in such a direction that while receiving products from the fly the conveyor moves in the same general direction as the delivery side of the fly, a shaft, a pair of arms secured in spaced relationship on the shaft, means supporting the shaft for oscillatory movement between two positions, the axis of oscillation being above and to one side of the axis of rotation of the fly, a first abutment finger secured to each of the arms and held, in a first position of the shaft, presented to products carried by the fly, a second finger carried by each arm and disposed at a smaller distance from the shaft than the first finger, the second finger being presented to products carried by the fly when the shaft is in its second position, and means operating periodically to oscillate the shaft quickly between its first and second positions.

8. Delivery mechanism comprising in combination a fly, means rotating the fly, a conveyor device adapted to move past the fly in such a direction that while receiving products from the fly the conveyor moves in the same general direction as the delivery side of the fly, a shaft, a pair of arms secured in spaced relationship on the shaft, means supporting the shaft for oscillatory movement between two positions, the axis of oscillation being above and to one side of the axis of rotation of the fly, a first abutment finger secured to each of the arms and held, in a first position of the shaft, presented to products carried by the fly, a second finger carried by each arm and disposed at a smaller distance from the shaft than the first finger, the second finger being presented to products carried by the fly when the shaft is in its second position, and continuously operating cam mechanism operating periodically to oscillate the shaft quickly between its first and second positions.

9. Delivery mechanism comprising in combination a fly, means rotating the fly, a conveyor device adapted to move past the fly in such a direction that while receiving products from the fly the conveyor moves in the same general direction as the delivery side of the fly, a shaft, a pair of arms secured in spaced relationship on the shaft, means supporting the shaft for oscillatory movement between two positions, the axis of oscillation being above and to one side of the axis of rotation of the fly, a first abutment finger secured to each of the arms and held, in a first position of the shaft, presented to products carried by the fly, a second finger carried by each arm and disposed at a smaller distance from the shaft than the first finger, the second finger being presented to products carried by the fly when the shaft is in its second position, a cam, means continuously rotating the cam, a cam follower in engagement with the cam, and a linkage connecting the follower and the said shaft, the cam being arranged periodically to oscillate the shaft quickly between its first and second positions.

10. In delivery mechanism, a rotatable fly, a conveyor adapted to move past the delivery side of the fly, a first abutment arm disposed substantially parallel to the side face of the fly and inwardly beyond the periphery thereof to engage and release products therefrom, a second abutment arm disposed substantially parallel to the side face of the fly and outwardly from the periphery thereof, and means to swing said arms in a path parallel to the side face of the fly including means temporarily operable to cause said swinging means to dispose the first arm inwardly out of product engaging position and said second arm inwardly into product engaging position.

11. In delivery mechanism, a rotatable fly, a conveyor adapted to move past the delivery side of the fly, a first abutment arm disposed substantially parallel to the side face of the fly and inwardly beyond the periphery thereof to engage and release products therefrom, a second abutment arm disposed substantially parallel to the side face of the fly and outwardly from the periphery thereof, a pivoted support upon which said arms are mounted, a rotatable cam, a connection between said support and said cam and temporarily actuated by the cam to swing said support to dispose the first arm out of product engageable position and the second arm into product engageable position.

12. In delivery mechanism, a rotatable fly, a conveyor adapted to move past the delivery side of the fly and receive products therefrom, a pair of spaced apart abutment members, a support for the abutment members adapted to be moved toward and away from said fly to present either of the members in position to engage products carried by the fly, and means to move the support toward and away from said fly to only temporarily present one of the abutment members in product engaging position.

CECIL GEORGE QUICK.
   DONALD ARTHUR BALL.
   WILLIAM ARNOLD WHITEHEAD.